(12) United States Patent
Sunahiro (10) Patent No.: US 9,937,762 B2
(45) Date of Patent: Apr. 10, 2018

(54) SIDE-BY-SIDE ALL TERRAIN VEHICLE INCLUDING STABILIZER BAR

(71) Applicant: YAMAHA HATSUDOKI KABUSHIKI KAISHA, Iwata-shi, Shizuoka (JP)

(72) Inventor: Kazuo Sunahiro, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 36 days.

(21) Appl. No.: 15/002,533

(22) Filed: Jan. 21, 2016

(65) Prior Publication Data

US 2016/0236528 A1 Aug. 18, 2016

(30) Foreign Application Priority Data

Feb. 12, 2015 (JP) .................................. 2015-025368

(51) Int. Cl.
| | | |
|---|---|---|
| *B60G 3/20* | (2006.01) | |
| *B60G 21/055* | (2006.01) | |
| *B60G 7/00* | (2006.01) | |
| *B60G 11/20* | (2006.01) | |

(52) U.S. Cl.
CPC ............... *B60G 3/20* (2013.01); *B60G 7/001* (2013.01); *B60G 11/20* (2013.01); *B60G 21/0551* (2013.01); *B60G 2200/144* (2013.01); *B60G 2204/122* (2013.01); *B60G 2204/1224* (2013.01); *B60G 2204/416* (2013.01); *B60G 2300/07* (2013.01); *B60G 2300/13* (2013.01)

(58) Field of Classification Search
CPC ........ B60G 3/20; B60G 21/05; B60G 21/052; B60G 21/055; B60G 21/0551; B60G 2200/144; B60G 2204/122; B60G 2204/1222; B60G 2204/1224
USPC .................................................. 280/124.152
See application file for complete search history.

(56) References Cited

U.S. PATENT DOCUMENTS

| | | | | |
|---|---|---|---|---|
| 3,551,990 A | * | 1/1971 | Wehner ..................... | B60G 7/02 267/254 |
| 3,733,087 A | * | 5/1973 | Allison .................. | B60G 7/001 267/276 |
| 3,864,989 A | * | 2/1975 | Jones ........................ | B60G 3/06 280/124.152 |
| 4,113,278 A | * | 9/1978 | Rissberger ......... | B60G 21/0551 280/124.106 |
| 4,153,272 A | * | 5/1979 | Fiedler ..................... | B60G 3/26 280/124.106 |
| 4,231,555 A | * | 11/1980 | Saito ..................... | B60G 21/055 267/154 |
| 4,484,767 A | * | 11/1984 | Klem .................... | B60G 17/033 280/124.107 |
| 4,526,628 A | * | 7/1985 | Ohno ...................... | B23P 15/00 148/520 |

(Continued)

*Primary Examiner* — Barry Gooden, Jr.
(74) *Attorney, Agent, or Firm* — Keating and Bennett, LLP (57) ABSTRACT

A vehicle includes a torsion bar including a central portion, a left coupling, and a right coupling. The central portion extends in a lateral direction in front of a left drive shaft and a right drive shaft. The left coupling is positioned to the left of the central portion and coupled to a portion of a left lower arm that is rearward relative to the left drive shaft. The right coupling is positioned to the right of the central portion and coupled to a portion of a right lower arm that is rearward relative to the right drive shaft.

15 Claims, 7 Drawing Sheets

(56) References Cited

U.S. PATENT DOCUMENTS

| | | | | |
|---|---|---|---|---|
| 4,542,920 A * | 9/1985 | Kijima | ............ | B60G 3/205 267/190 |
| 4,842,298 A | 6/1989 | Jarvis | | |
| 5,064,216 A * | 11/1991 | Hynds | ............ | B60G 11/20 280/124.152 |
| 5,368,326 A * | 11/1994 | Turck | ............ | B60G 21/0551 267/277 |
| 5,609,331 A * | 3/1997 | Hoag | ............ | B60G 11/20 267/154 |
| 5,788,264 A * | 8/1998 | Adkins | ............ | B60G 21/0551 280/124.106 |
| 5,797,618 A * | 8/1998 | Brokholc | ............ | B60G 7/00 280/124.106 |
| 6,547,894 B1 * | 4/2003 | Smith | ............ | B60G 21/055 148/521 |
| 8,485,303 B2 | 7/2013 | Yamamoto et al. | | |
| 9,452,657 B1 * | 9/2016 | Giaier | ............ | B60Q 1/10 |
| 2002/0093169 A1 * | 7/2002 | Peterson | ............ | B60G 11/28 280/124.152 |
| 2003/0080526 A1 * | 5/2003 | Conover | ............ | B60G 17/025 280/124.106 |
| 2003/0173001 A1 * | 9/2003 | Smith | ............ | B60G 21/055 148/521 |
| 2006/0151970 A1 * | 7/2006 | Kaminski | ............ | B60G 3/06 280/124.134 |
| 2007/0085295 A1 * | 4/2007 | Johnson | ............ | B60G 3/20 280/124.152 |
| 2009/0160155 A1 * | 6/2009 | Shimatami | ............ | B60G 3/04 280/124.152 |
| 2010/0032920 A1 * | 2/2010 | Hong | ............ | B60G 7/001 280/124.109 |
| 2010/0225083 A1 * | 9/2010 | Jung | ............ | B60G 21/055 280/124.107 |
| 2012/0223500 A1 * | 9/2012 | Kinsman | ............ | B60G 3/20 280/124.153 |
| 2013/0147135 A1 * | 6/2013 | Lee | ............ | B60G 17/0162 280/5.508 |
| 2013/0161109 A1 | 6/2013 | Sunsdahl et al. | | |
| 2013/0234412 A1 * | 9/2013 | Kuroda | ............ | B60G 7/005 280/124.107 |
| 2013/0257006 A1 * | 10/2013 | Kunert | ............ | B60G 3/20 280/124.136 |
| 2013/0270787 A1 * | 10/2013 | Suwa | ............ | B60G 21/0551 280/124.107 |
| 2014/0060709 A1 * | 3/2014 | Tange | ............ | C21D 6/005 148/568 |
| 2014/0262588 A1 * | 9/2014 | Bruns | ............ | B60K 1/00 180/291 |
| 2015/0028531 A1 * | 1/2015 | Grundmeier | ............ | B60G 21/0551 267/141.2 |
| 2015/0061275 A1 * | 3/2015 | Deckard | ............ | B60G 21/055 280/788 |
| 2015/0108726 A1 * | 4/2015 | Mosher | ............ | B60G 17/0277 280/5.507 |

\* cited by examiner

SIDE-BY-SIDE ALL TERRAIN VEHICLE INCLUDING STABILIZER BAR

CROSS-REFERENCE TO RELATED APPLICATIONS

The present application claims priority to Japanese Patent Application No. 2015-25368, filed on Feb. 12, 2015, which is incorporated by reference herein in its entirety.

BACKGROUND OF THE INVENTION

1. Field of the Invention

The present invention relates to a vehicle suitable for traveling over uneven ground.

2. Description of the Related Art

Vehicles such as All Terrain Vehicles (hereinafter referred to as ATVs) and Recreational Off-Highway Vehicles (hereinafter referred to as ROVs) have conventionally been known as vehicles suitable for traveling over uneven ground. A vehicle of this type is provided with an upper and lower pair of arms that support the front wheel swingably relative to the vehicle body, that is, an upper arm and a lower arm positioned below the upper arm. In a known example of the upper arm and the lower arm, the dimension of a portion thereof coupled to the vehicle body (hereinafter referred to as a vehicle body coupling) along a vehicle longitudinal direction is greater than the dimension of a portion thereof coupled to the front wheel (hereinafter referred to as a front wheel coupling) along the vehicle longitudinal direction.

Vehicles for traveling over uneven ground often make many turning movements. However, when the vehicle turns to the left, for example, a great force acts on the right front wheel, causing the right front wheel to change its position farther upward relative to the vehicle body and thus producing a roll angle. In view of this problem, a torsion bar may be provided between the left front wheel and the right front wheel in order to reduce the roll angle. In a vehicle provided with the torsion bar, the torsion bar is twisted when the vehicle turns to the left and thus the right front wheel changes its position upward. This twisting of the torsion bar causes a downward force to act on the right front wheel and causes an upward force to act on the left front wheel. This reduces the roll angle and therefore offers a better riding comfort to the rider.

U.S. Pat. No. 8,485,303 and U.S. Published Patent Application No. 2013/0161109 disclose a torsion bar attached to the upper arm of the upper and lower arms that support the front wheel. U.S. Pat. No. 4,842,298 discloses a torsion bar attached to the lower arm.

In the vehicles disclosed in U.S. Pat. No. 8,485,303 and U.S. Published Patent Application No. 2013/0161109, the center of gravity of the vehicle is high because the torsion bar is attached to the upper arm.

In the vehicle disclosed in U.S. Pat. No. 4,842,298, the upper arm and the lower arm are not such that the dimension of the vehicle body coupling along the vehicle longitudinal direction is greater than the dimension of the front wheel coupling along the vehicle longitudinal direction. The torsion bar disclosed in U.S. Pat. No. 4,842,298 includes a rod-shaped central portion extending in a transverse direction, a left coupling that joins the left end of the central portion and a left side lower arm to each other, and a right coupling that joins the right end of the central portion and a right side lower arm to each other. The left coupling and the right coupling are attached to a front portion of the lower arm. This means that there is a possibility that the left coupling and the right coupling of the torsion bar may be hit by flying objects from the front.

SUMMARY OF THE INVENTION

In view of the foregoing and other problems, preferred embodiments of the present invention provide a vehicle including a torsion bar that provides a better riding comfort by keeping the center of gravity of the vehicle low and that prevents the couplings of the torsion bar from being hit by flying objects.

A preferred embodiment of the present invention is a vehicle including a body frame including a front frame; a left front wheel disposed to the left of the front frame; a right front wheel disposed to the right of the front frame; a left lower arm including a front wheel coupling coupled to the left front wheel and a vehicle body coupling coupled to the front frame; a left upper arm including a front wheel coupling coupled to the left front wheel and a vehicle body coupling coupled to the front frame, the left upper arm being disposed above the left lower arm; a right lower arm including a front wheel coupling coupled to the right front wheel and a vehicle body coupling coupled to the front frame; a right upper arm including a front wheel coupling coupled to the right front wheel and a vehicle body coupling coupled to the front frame, the right upper arm being disposed above the right lower arm; a left drive shaft connected to the left front wheel and extending rightward from the left front wheel, the left drive shaft drives the left front wheel; and a right drive shaft connected to the right front wheel and extending leftward from the right front wheel, the right drive shaft drives the right front wheel. The dimension of the vehicle body coupling of the left lower arm along a vehicle longitudinal direction is greater than the dimension of the front wheel coupling of the left lower arm along the vehicle longitudinal direction. The dimension of the vehicle body coupling of the right lower arm along the vehicle longitudinal direction is greater than the dimension of the front wheel coupling of the right lower arm along the vehicle longitudinal direction. The vehicle further includes a torsion bar including a central portion extending in a transverse direction and located in front of the left drive shaft and the right drive shaft, a left coupling positioned leftward relative to the central portion and coupled to a portion of the left lower arm that is rearward relative to the left drive shaft, and a right coupling positioned rightward relative to the central portion and coupled to a portion of the right lower arm that is rearward relative to the right drive shaft.

In the above-described vehicle, the dimension of the vehicle body coupling of each of the left lower arm and the right lower arm along the vehicle longitudinal direction is greater than the dimension of the front wheel coupling thereof along the vehicle longitudinal direction. Moreover, in the above-described vehicle, the left coupling of the torsion bar is coupled to the left lower arm, and the right coupling of the torsion bar is coupled to the right lower arm. As a result, the center of gravity of the vehicle is kept low. Riding comfort is also improved. Furthermore, the left coupling of the torsion bar is coupled to a portion of the left lower arm that is rearward relative to the left drive shaft, and the right coupling of the torsion bar is coupled to a portion of the right lower arm that is rearward relative to the right drive shaft. This makes it possible to prevent the left coupling and the right coupling of the torsion bar from being hit by flying objects from the front.

In a preferred embodiment of the present invention, the left lower arm includes a front frame inclined so as to slope rearward toward the left and a rear frame positioned rearward relative to the front frame and inclined so as to slope forward toward the left. The right lower arm includes a front frame inclined so as to slope rearward toward the right and a rear frame positioned rearward relative to the front frame and inclined so as to slope forward toward the right. The left coupling of the torsion bar is coupled to the rear frame of the left lower arm, and the right coupling of the torsion bar is coupled to the rear frame of the right lower arm.

In the above-described preferred embodiment, the front frame of the left lower arm is positioned in front of the left coupling of the torsion bar, and the front frame of the right lower arm is positioned in front of the right coupling. This significantly reduces or prevents the left coupling and the right coupling of the torsion bar from being hit by flying objects from the front.

In another preferred embodiment of the present invention, the central portion of the torsion bar is disposed above the vehicle body coupling of the left lower arm, above the vehicle body coupling of the right lower arm, below the vehicle body coupling of the left upper arm, and below the vehicle body coupling of the right upper arm.

The above-described preferred embodiment effectively utilizes, as a space to install the central portion of the torsion bar, the space that is above the vehicle body coupling of the left lower arm, above the vehicle body coupling of the right lower arm, below the vehicle body coupling of the left upper arm, and below the vehicle body coupling of the right upper arm. Moreover, the above-described preferred embodiment allows the center of gravity of the vehicle to be lower than the case in which the central portion of the torsion bar is disposed above the vehicle body coupling of the left upper arm and the vehicle body coupling of the right upper arm. Moreover, it eliminates the need to ensure a space to install the torsion bar above the vehicle body coupling of the left upper arm and the vehicle body coupling of the right upper arm, thus increasing the freedom in vehicle layout design.

In another preferred embodiment of the present invention, the torsion bar includes a left portion connecting a left end of the central portion and the left coupling to each other, and a right portion connecting a right end of the central portion and the right coupling to each other. Each of the left portion and the right portion includes a first curved portion curved rearwardly.

In the above-described preferred embodiment, each of the left portion and the right portion of the torsion bar includes the first curved portion. Therefore, the central portion, which is disposed forward relative to the left drive shaft and the right drive shaft, is connected to the left coupling and the right coupling, which are positioned rearward relative to the left drive shaft and the right drive shaft, in a smooth and compact manner. The above-described preferred embodiment makes it possible to arrange the torsion bar in a compact manner.

In another preferred embodiment of the present invention, each of the left portion and the right portion of the torsion bar is inclined downward toward the rear, as viewed from a side view of the vehicle.

With the above-described preferred embodiment, the central portion and the left coupling, which is connected to the left lower arm, are connected to each other in a smooth and compact manner. The central portion and the right coupling, which is connected to the right lower arm, are also connected to each other in a smooth and compact manner. The above-described preferred embodiment makes it possible to arrange the torsion bar in a compact manner.

In another preferred embodiment of the present invention, the left portion of the torsion bar includes a second curved portion curved downwardly behind the left drive shaft, as viewed from a side view of the vehicle. The right portion of the torsion bar includes a second curved portion curved downwardly behind the right drive shaft, as viewed from a side view of the vehicle.

With the above-described preferred embodiment, the central portion and the left coupling are connected to each other in a smooth and compact manner without being obstructed by the left drive shaft. The central portion and the right coupling are also connected to each other in a smooth and compact manner without being obstructed by the right drive shaft. The above-described preferred embodiment makes it possible to arrange the torsion bar in a compact manner.

In another preferred embodiment of the present invention, a portion of the left portion of the torsion bar is disposed between the left lower arm and the left upper arm, and a portion of the right portion of the torsion bar is disposed between the right lower arm and the right upper arm.

With the above-described preferred embodiment, the space between the left lower arm and the left upper arm is efficiently utilized as space to install the left portion of the torsion bar. Likewise, the space between the right lower arm and the right upper arm is efficiently utilized as space to install the right portion of the torsion bar. As a result, the above-described preferred embodiment achieves more freedom in vehicle layout design. Moreover, it enables the center of gravity of the vehicle to be lower than the configuration in which the left portion of the torsion bar is disposed above the left upper arm and the right portion of the torsion bar is disposed above the right upper arm.

In another preferred embodiment of the present invention, a portion of the left portion of the torsion bar is disposed between the left drive shaft and the left upper arm. A portion of the right portion of the torsion bar is disposed between the right drive shaft and the right upper arm.

With the above-described preferred embodiment, the space between the left drive shaft and the left upper arm is efficiently utilized as a space to install the left portion of the torsion bar. Likewise, the space between the right drive shaft and the right upper arm is efficiently utilized as a space to install the right portion of the torsion bar. As a result, the above-described preferred embodiment allows more freedom in vehicle layout design. Moreover, it allows the center of gravity of the vehicle to be lower than the configuration in which the left portion of the torsion bar is disposed above the left upper arm and the right portion of the torsion bar is disposed above the right upper arm.

In another preferred embodiment of the present invention, at least one of the left coupling and the right coupling of the torsion bar includes a ball joint.

The above-described preferred embodiment allows the torsion bar and the left lower arm to be coupled to each other smoothly and also allows the torsion bar and the right lower arm to be coupled to each other smoothly.

In another preferred embodiment of the present invention, the vehicle preferably further includes a front differential connected to the left drive shaft and the right drive shaft. The central portion of the torsion bar is disposed in front of the front differential.

With the above-described preferred embodiment, the space in front of the front differential is efficiently utilized as space to install the central portion of the torsion bar, so that freedom in vehicle layout design is increased.

In another preferred embodiment of the present invention, the vehicle preferably further includes a front bumper mounted to the front frame and disposed in front of the front frame. The central portion of the torsion bar is disposed behind the front bumper.

According to the above-described preferred embodiment, when a flying object comes in from the front, the flying object hits the front bumper. Thus, the central portion of the torsion bar is prevented from being hit by flying objects.

In another preferred embodiment of the present invention, the vehicle preferably further includes a left side suspension mounted to the left upper arm, and a right side suspension mounted to the right upper arm.

The above-mentioned preferred embodiment makes it easier to mount the suspensions than the case in which the left side suspension is mounted to the left lower arm and the right side suspension is mounted to the right lower arm.

In another preferred embodiment of the present invention, the left upper arm includes a front frame inclined so as to slope rearward toward the left and a rear frame positioned rearward relative to the front frame and inclined so as to slope forward toward the left. The right upper arm includes a front frame inclined so as to slope rearward toward the right and a rear frame positioned rearward relative to the front frame and inclined so as to slope forward toward the right.

The above-mentioned preferred embodiment provides a vehicle including the left upper arm and the right upper arm.

In another preferred embodiment of the present invention, the vehicle is preferably an ROV.

The above-described preferred embodiment makes it possible to obtain the advantageous effects described above with an ROV.

Thus, preferred embodiments of the present invention make it possible to provide a vehicle including a torsion bar that provides a better riding comfort by keeping the center of gravity of the vehicle low and that significantly reduces or prevents the couplings of the torsion bar from being hit by flying objects.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
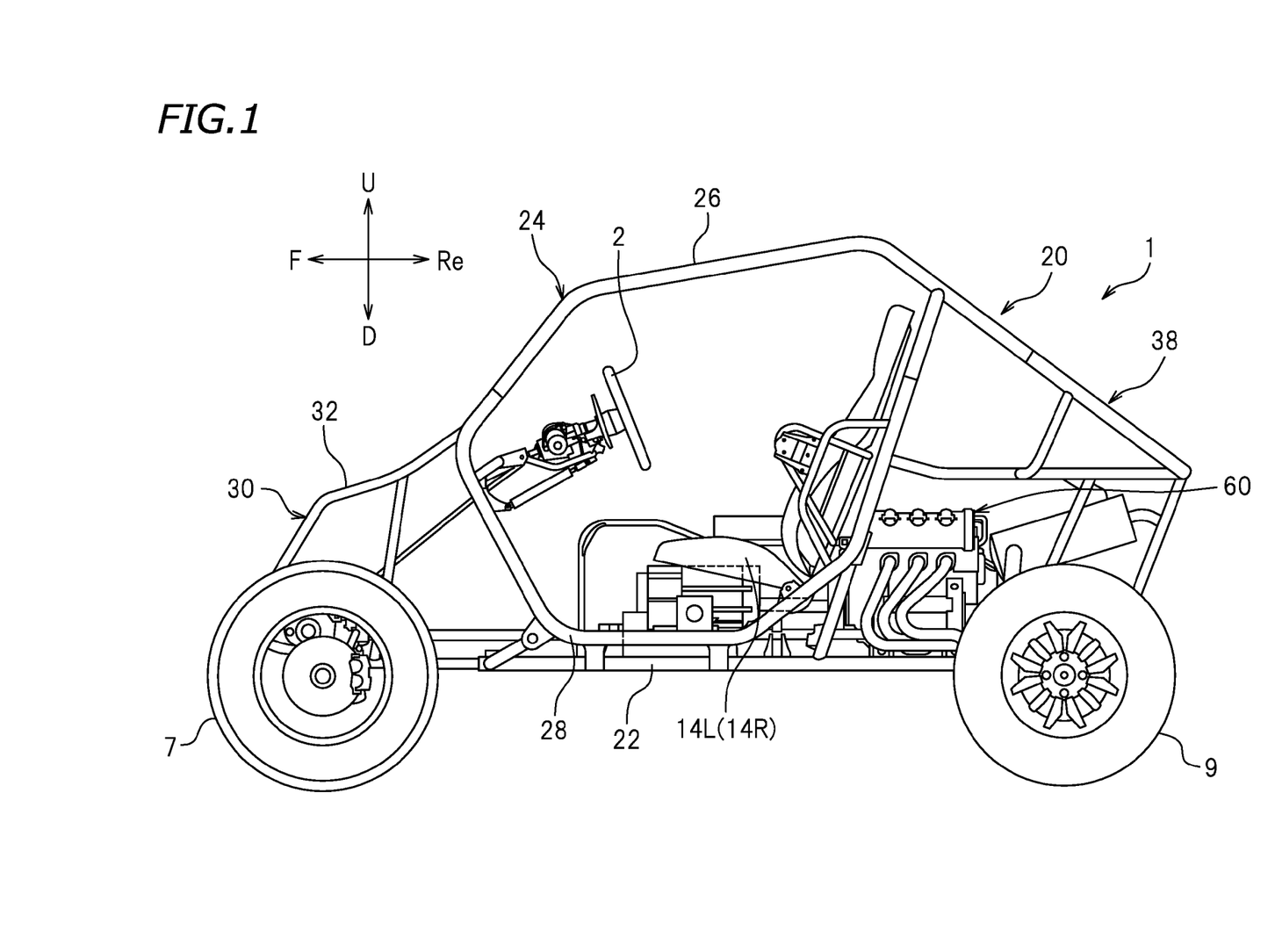
FIG. 1 is a left side view illustrating an ROV according to a preferred embodiment of the present invention.

Hereinbelow, vehicles according to preferred embodiments of the present invention will be described. As illustrated in FIG. 1, the vehicle according to the present preferred embodiment is preferably an ROV 1. The ROV 1 is suitable for traveling over uneven ground. The vehicle according to preferred embodiments of the present invention is not limited to the ROV 1. The vehicle may be, for example, an ATV.

In the following description, the terms "front," "rear," "left," "right," "up," and "down" respectively refer to front, rear, left, right, up, and down as defined based on the perspective of the driver seated on the seat 14L of the ROV 1, unless specifically indicated otherwise. The terms "above/up" and "below/down" respectively mean the relative vertical positions above/up and below/down as used when the ROV 1 is at a standstill on a horizontal plane. Reference characters F, Re, L, R, U, and D in the drawings indicate front, rear, left, right, up, and down, respectively.

As illustrated in FIG. 1, the ROV 1 includes a body frame 20 preferably including pipe-shaped frame members, for example. The body frame 20 includes a main frame 22 extending in a vehicle longitudinal direction, a center frame 24 disposed above the main frame 22, a front frame 30 disposed in front of the center frame 24, and a rear frame 38 disposed behind the center frame 24. The center frame 24 includes an upper center frame 26 and a lower center frame 28. The upper center frame 26 is disposed above the lower center frame 28. Seats 14L and 14R (see FIG. 2) and a steering wheel 2 are disposed, as viewed from a side view of the vehicle, between the upper center frame 26 and the lower center frame 28.

Figure 2:
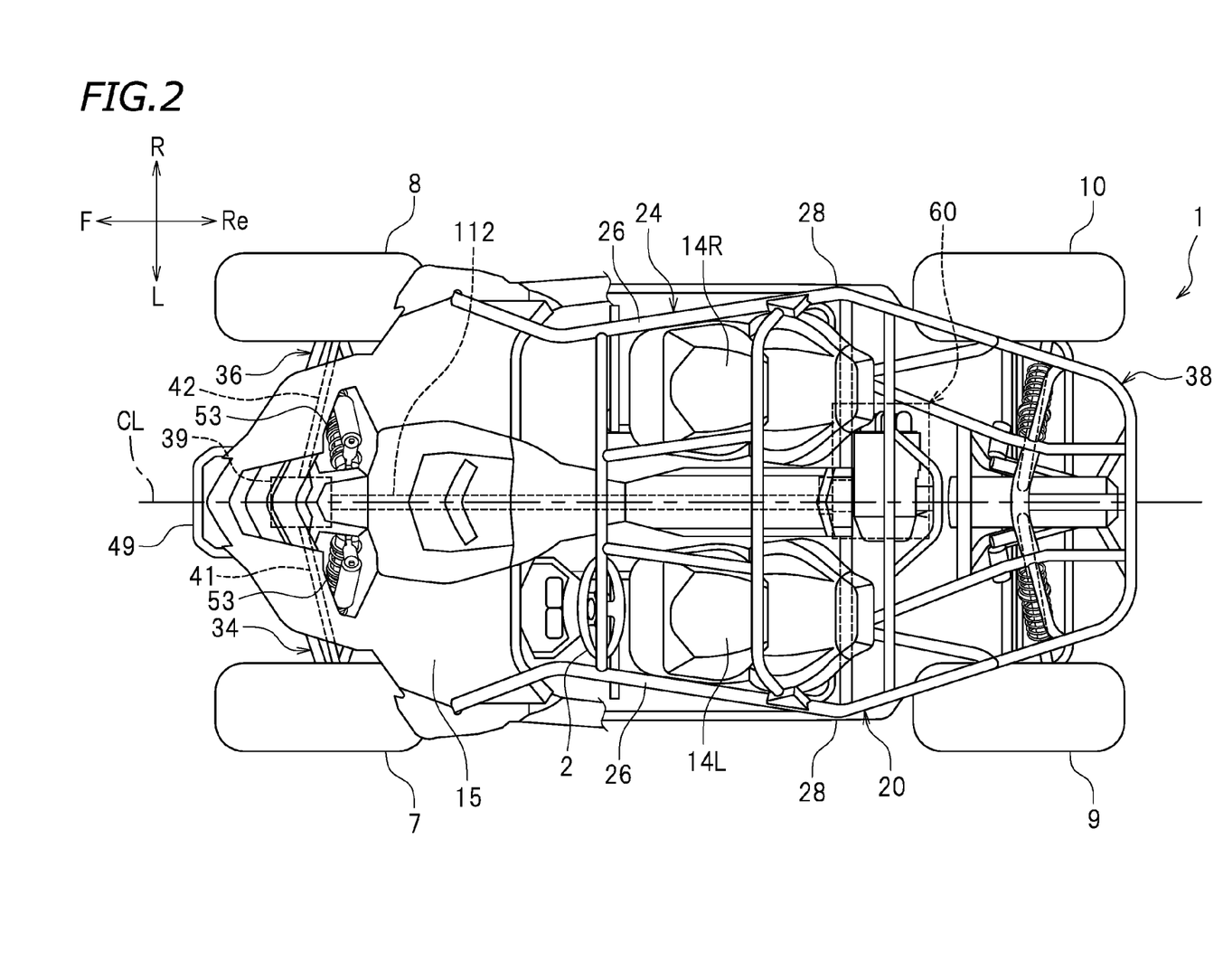
FIG. 2 is a plan view of the ROV.

FIG. 2 is a plan view of the ROV 1. Note that a front cover 15 disposed above the front frame 30 is shown in FIG. 2, but the front cover 15 is omitted from the figures other than FIG. 2 for clarity. The ROV 1 includes an engine 60, a left front wheel 7, a right front wheel 8, a left rear wheel 9, and a right rear wheel 10. The engine 60 is supported by the body frame 20. The engine 60 and the left front wheel 7 are coupled to each other via a propeller shaft 112, a front differential 39, and a left drive shaft 41, so as to transmit mechanical power. The engine 60 and the right front wheel 8 are coupled to each other via the propeller shaft 112, the front differential 39, and a right drive shaft 42, so as to transmit mechanical power. Likewise, the engine 60 and the left rear wheel 9 are coupled to each other so as to transmit mechanical power, and the engine 60 and the right rear wheel 10 are also coupled to each other so as to transmit mechanical power, although not shown in the drawings. The seat 14R is disposed to the right of the seat 14L. Thus, the ROV 1 includes a plurality of seats 14L and 14R, which are arranged side by side. The line CL in the figure indicates the vehicle center line.

Figure 3:
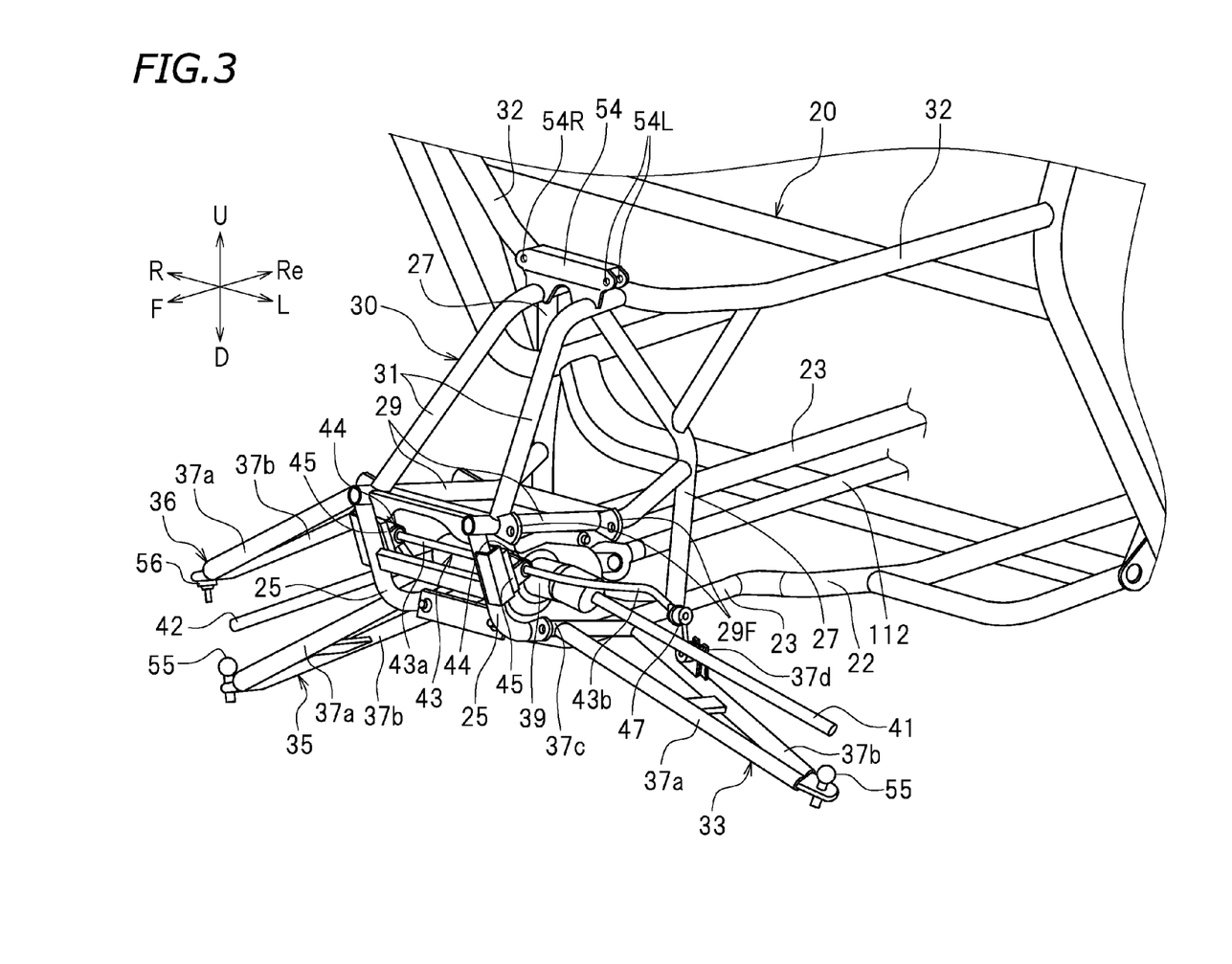
FIG. 3 is a perspective view illustrating main portions of the ROV, as viewed from the left front thereof.

As illustrated in FIG. 3, the front frame 30 includes left side and right side front lower frames 23 each extending in a vehicle longitudinal direction. The front frame 30 preferably has a bilaterally symmetrical shape with respect to the vehicle center line CL. For this reason, only the left portion of the front frame 30 will be described in the following description, and the description of the right portion thereof will be omitted.

A left side front end frame 25 extending in a vehicle vertical direction is connected to the front end of the left side front lower frame 23. A left side front subframe 27 extending upward is connected to the left side front lower frame 23. A left side front middle frame 29 extending in a vehicle longitudinal direction is connected to the upper end of the left side front end frame 25 and to the left side front subframe 27. A left side front upper frame 31 extending upward is connected to a front portion of the left side front middle frame 29 and to a front portion of a left upper front frame 32. A mounting member 54 is secured to an upper portion of the left side front upper frame 31 and to an upper portion of a right side front upper frame 31. The mounting member 54 includes holes 54L provided in a left portion thereof, and the mounting member 54 also includes holes 54R provided in a right portion thereof.

Figure 4:
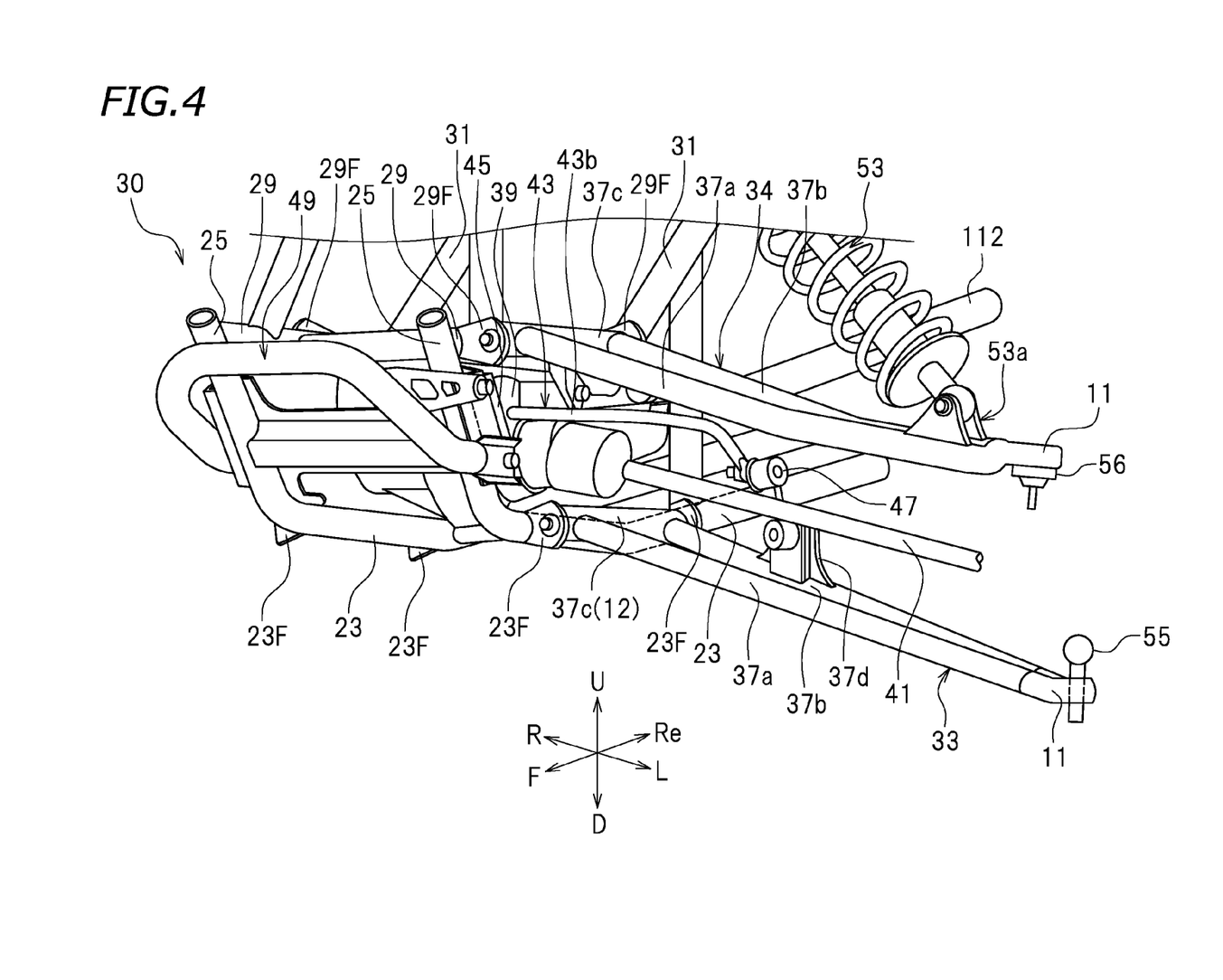
FIG. 4 is an enlarged perspective view illustrating main portion of the ROV, as viewed from the left front thereof.

As illustrated in FIG. 4, a front bumper 49 is connected to the left side front end frame 25 and to the right side front end frame 25. The front bumper 49 is disposed in front of the front end frames 25 and in front of the front frame 30.

Figure 5:
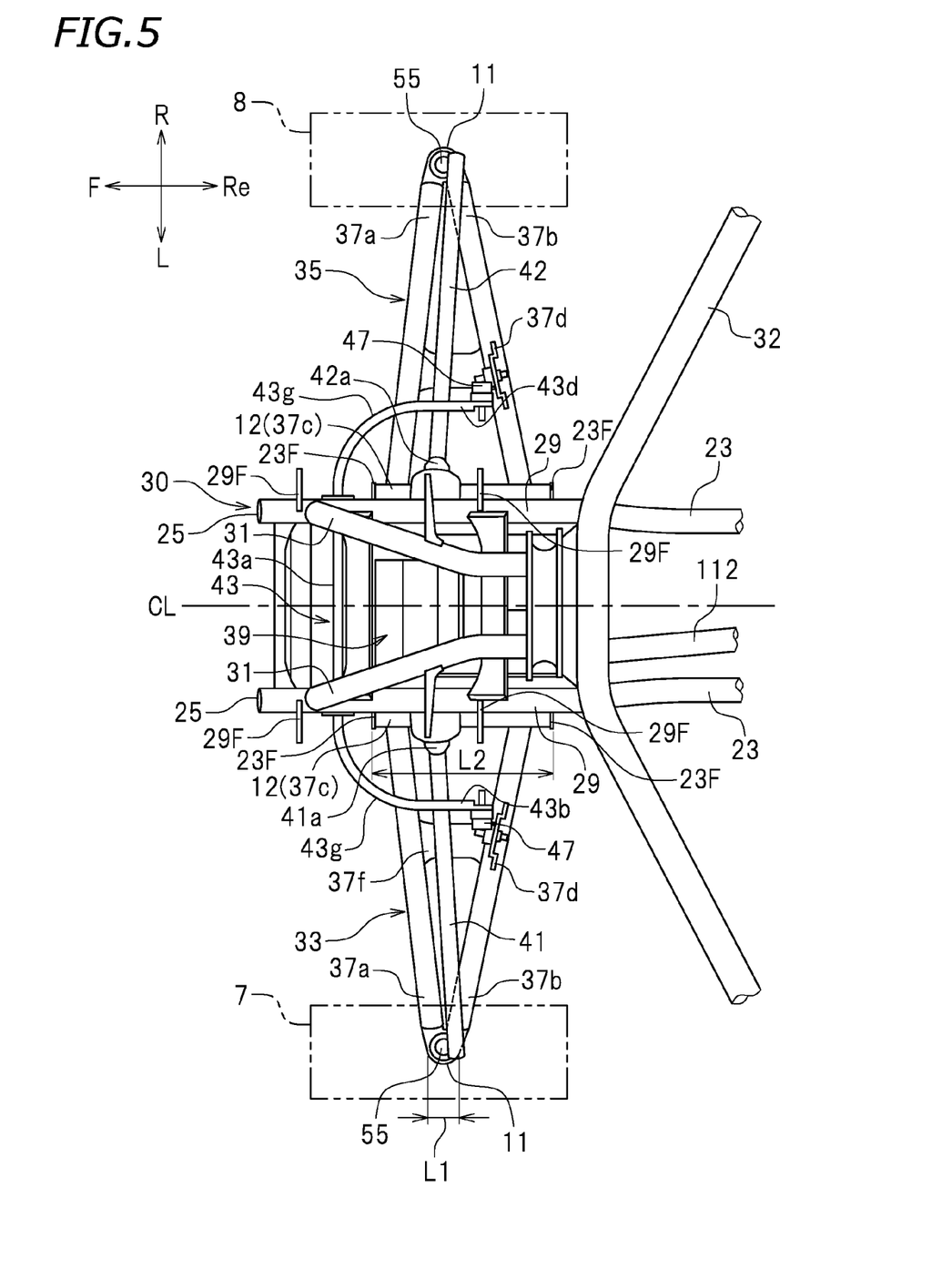
FIG. 5 is a plan view illustrating main portions of the ROV.
Figure 6:
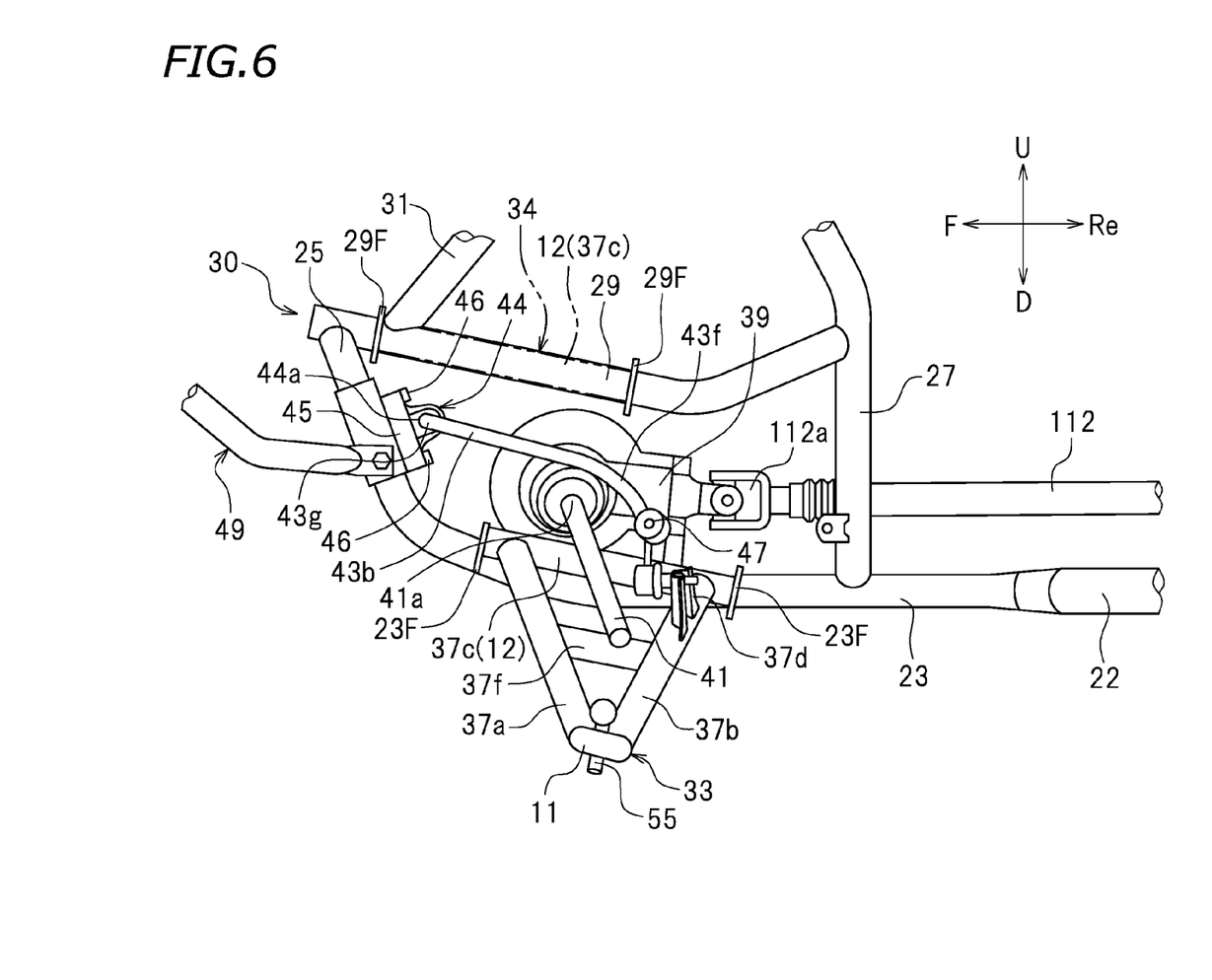
FIG. 6 is a left side view illustrating main portions of the ROV.
Figure 7:
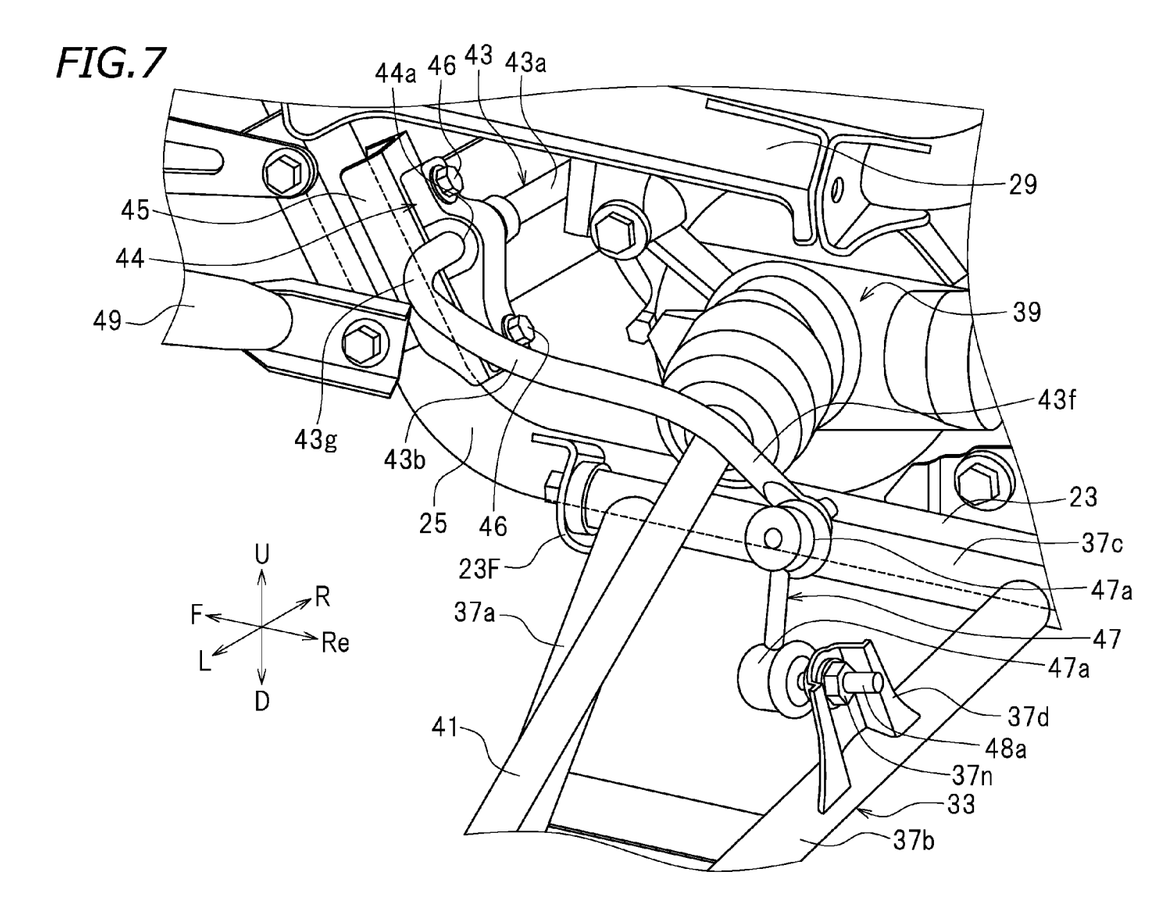
FIG. 7 is a perspective view illustrating main portions of the ROV, as viewed from the left rear thereof.

The ROV 1 includes a left lower arm 33 and a left upper arm 34 that swingably support the left front wheel 7. The left upper arm 34 is disposed above the left lower arm 33. As illustrated in FIG. 3, the ROV 1 includes a right lower arm 35 and a right upper arm 36 that swingably support the right front wheel 8. The right upper arm 36 is disposed above the right lower arm 35. Note that the left upper arm 34 is not shown in FIG. 3. In FIG. 4, the right lower arm 35 and the right upper arm 36 are not shown. In FIG. 5, the left upper arm 34 and the right upper arm 36 are not shown. In FIGS. 6 and 7, the left upper arm 34 is not shown.

FIG. 5 is a plan view illustrating the left lower arm 33, the right lower arm 35, and so forth. The left lower arm 33 includes a front wheel coupling 11 coupled to the left front wheel 7 and a vehicle body coupling 12 coupled to the front lower frame 23 of the front frame 30. The front wheel coupling 11 is coupled to the left front wheel 7 by a kingpin 55. A pair of flanges 23F that are spaced apart, fore and aft, from each other are provided on the front lower frame 23, and the vehicle body coupling 12 is rotatably supported by these flanges 23F. The dimension L2 of the vehicle body coupling 12 along the vehicle longitudinal direction is greater than the dimension L1 of the front wheel coupling 11 along the vehicle longitudinal direction.

The left lower arm 33 includes a base frame 37c supported by the flanges 23F and extending in a vehicle longitudinal direction, a front frame 37a connected to the base frame 37c, a rear frame 37b connected to the base frame 37c, and a coupling 37f extending between the front frame 37a and the rear frame 37b. The right end portion of the front frame 37a and the right end portion of the rear frame 37b are spaced apart from each other, whereas the left end portion of the front frame 37a and the left end portion of the rear frame 37b are connected to each other. The front frame 37a is inclined so as to slope rearward toward the left. The rear frame 37b is disposed behind the front frame 37a and is inclined so as to slope forward toward the left. The left lower arm 33 is preferably has a shape such that its dimension along the vehicle longitudinal direction becomes shorter toward the left.

In the present preferred embodiment, the base frame 37c, the front frame 37a, and the rear frame 37b preferably have a tubular shape, for example. However, the base frame 37c, the front frame 37a, and the rear frame 37b may have a solid rod shape. The cross-sectional shape of the base frame 37c, the front frame 37a, and the rear frame 37b may be circular, quadrangular, or any other suitable shape. The cross-sectional shape of the base frame 37c, the front frame 37a, and the rear frame 37b is not particularly limited. In the present preferred embodiment, the left lower arm 33 includes the front frame 37a and the rear frame 37b. However, the left lower arm 33 may have a flat plate shape such that its dimension along the vehicle longitudinal direction becomes shorter toward the left. The base frame 37c is not always necessary, and may be omitted.

The left upper arm 34 has a similar configuration to the left lower arm 33. Therefore, in the following description, the portions of the left upper arm 34 that are the same as those of the left lower arm 33 are designated by the same reference numerals, and further description thereof is omitted. As illustrated in FIG. 3, a fore-and-aft pair of flanges 29F are provided on the left side front middle frame 29. As illustrated in FIG. 4, the base frame 37c of the left upper arm 34 is rotatably supported by these flanges 29F. The front wheel coupling 11 of the left upper arm 34 is provided with a control arm 56. The front wheel coupling 11 of the left upper arm 34 is coupled to the left front wheel 7 by the control arm 56.

As illustrated in FIG. 5, the right lower arm 35 preferably has a similar configuration to that of the left lower arm 33, and the right lower arm 35 and the left lower arm 33 are disposed symmetrically with respect to the vehicle center line CL. Therefore, in the following description, the portions of the right lower arm 35 that are the same as those of the left lower arm 33 are designated by the same reference numerals, and further detailed description of the right lower arm 35 is omitted. The right lower arm 35 includes a front wheel coupling 11 coupled to the right front wheel 8 and a vehicle body coupling 12 coupled to the front lower frame 23 of the front frame 30. The dimension L2 of the vehicle body coupling 12 along the vehicle longitudinal direction is greater than the dimension L1 of the front wheel coupling 11 along the vehicle longitudinal direction. The front frame 37a of the right lower arm 35 is inclined so as to slope rearward toward the right, and the rear frame 37b of the right lower arm 35 is inclined so as to slope forward toward the right. The right lower arm 35 preferably has such a shape that its dimension along the vehicle longitudinal direction becomes shorter toward the right.

The right upper arm 36 preferably has a similar configuration to that of the left upper arm 34, and the right upper arm 36 and the left upper arm 34 are disposed symmetrically with respect to the vehicle center line CL. Therefore, in the following description, the portions of the right upper arm 36 that are the same as those of the left upper arm. 34 are designated by the same reference numerals, and further detailed description of the right upper arm 36 is omitted. The base frame 37c of the right upper arm 36 is rotatably supported by the fore-and-aft pair of flanges 29F provided on the right side front middle frame 29.

As illustrated in FIG. 6, the propeller shaft 112, which receives power from the engine 60 and rotates, extends in a vehicle longitudinal direction. The propeller shaft 112 includes a coupling 112a. The front differential 39 is connected to the coupling 112a.

The left drive shaft 41, which extends in a lateral direction, is connected to a left portion of the front differential 39. As illustrated in FIG. 5, the right drive shaft 42, which extends in a lateral direction, is connected to a right portion of the front differential 39. The left drive shaft 41 and the right drive shaft 42 rotate with the propeller shaft 112. The left drive shaft 41 is connected to the left front wheel 7, and it drives the left front wheel 7. As the left drive shaft 41 rotates, the left front wheel 7 rotates accordingly. The right drive shaft 42 is connected to the right front wheel 8, and it drives the right front wheel 8. As the right drive shaft 42 rotates, the right front wheel 8 rotates accordingly.

As illustrated in FIG. 5, a base coupling 41a of the left drive shaft 41 that is connected to the front differential 39 is disposed between the front frame 37a and the rear frame 37b of the left lower arm 33, as viewed in plan. Likewise, a base coupling 42a of the right drive shaft 42 that is connected to the front differential 39 is disposed between the front frame 37*a* and the rear frame 37*b* of the right lower arm 35, as viewed in plan.

As illustrated in FIG. 4, the left drive shaft 41 is disposed between the left upper arm 34 and the left lower arm 33. As illustrated in FIG. 6, the base coupling 41*a* of the left drive shaft 41 is disposed, as viewed from a side view of the vehicle, between the front middle frame 29 and the front lower frame 23. The base coupling 41*a* of the left drive shaft 41 is disposed between the base frame 37*c* of the left upper arm 34 and the base frame 37*c* of the left lower arm 33, as viewed from a side view of the vehicle. Note that in FIG. 6, the left upper arm 34 is not shown. As illustrated in FIG. 3, the right drive shaft 42 is disposed between the right upper arm 36 and the right lower arm 35. Although not shown in the drawings, the base coupling 42*a* of the right drive shaft 42 is disposed, as viewed from a side view of the vehicle, between the front middle frame 29 and the front lower frame 23 and between the base frame 37*c* of the right upper arm 36 and the base frame 37*c* of the right lower arm 35.

The ROV 1 is equipped with a torsion bar 43. Next, the details of the torsion bar 43 will be described. As illustrated in FIG. 5, the torsion bar 43 is coupled to the left lower arm 33 and the right lower arm 35. The torsion bar 43 includes a linear-shaped central portion 43*a* extending in a lateral direction, a left portion 43*b* positioned to the left of the central portion 43*a*, and a right portion 43*d* positioned to the right of the central portion 43*a*. The central portion 43*a*, the left portion 43*b*, and the right portion 43*d* are preferably integral, and they preferably have rod-shapes. As illustrated in FIG. 7, the torsion bar 43 includes a ball joint 47 coupled to the left lower arm 33. The ball joint 47 defines a left coupling coupled to the left lower arm 33. As illustrated in FIG. 5, the torsion bar 43 also includes a ball joint 47 coupled to the right lower arm 35. The ball joint 47 defines a right coupling coupled to the right lower arm 35.

As illustrated in FIG. 3, the central portion 43*a* of the torsion bar 43 is disposed behind the left side front end frame 25 and the right side front end frame 25. The central portion 43*a* is also disposed behind the front bumper 49 (see FIG. 4). The central portion 43*a* is disposed above the vehicle body coupling 12 of the left lower arm 33 and below the vehicle body coupling 12 of the left upper arm 34. Also, the central portion 43*a* is disposed above the vehicle body coupling 12 of the right lower arm 35 and below the vehicle body coupling 12 of the right upper arm 36.

As illustrated in FIG. 5, the central portion 43*a* of the torsion bar 43 extends across the vehicle center line CL. The central portion 43*a* preferably has a bilaterally symmetrical shape with respect to the vehicle center line CL. For this reason, only the left portion of the central portion 43*a* will be described in the following, and the description of the right portion thereof will be omitted. As illustrated in FIG. 7, a bracket 45 is provided on the left side front end frame 25. A mounting member 44 is fitted to the bracket 45 by a bolt 46, for example. The mounting member 44 includes a hole 44*a* provided therein. The central portion 43*a* of the torsion bar 43 is inserted through the hole 44*a*. Thus, the central portion 43*a* is supported by the mounting member 44. Likewise, a bracket 45 is also provided on the right side front end frame 25 (see FIG. 3) so that the central portion 43*a* of the torsion bar 43 is also supported by a right mounting member 44, although the detailed description is omitted.

As illustrated in FIG. 7, the left portion 43*b* of the torsion bar 43 includes a first curved portion 43*g* curved rearwardly. As illustrated in FIG. 6, the left portion 43*b* is inclined downward toward the rear, as viewed from aside view of the vehicle. The left portion 43*b* includes a second curved portion 43*f* curved downwardly behind the left drive shaft 41, as viewed from a side view of the vehicle. The left portion 43*b* is disposed above the vehicle body coupling 12 of the left lower arm 33 and below the vehicle body coupling 12 of the left upper arm 34. As illustrated in FIG. 4, a portion of the left portion 43*b* is disposed between the left lower arm 33 and the left upper arm 34. Since the left portion 43*b* extends rearward, the left portion 43*b* passes between the left lower arm 33 and the left upper arm 34. A portion of the left portion 43*b* is disposed between the left drive shaft 41 and the left upper arm 34. The left portion 43*b* passes between the left drive shaft 41 and the left upper arm 34.

As illustrated in FIG. 5, the torsion bar 43 preferably has a bilaterally symmetrical shape with respect to the vehicle center line CL. The right portion 43*d* of the torsion bar 43 preferably has a symmetrical shape to the left portion 43*b* and the right portion 43*d* and the left portion 43*b* are disposed so as to be bilaterally symmetrical to each other. The configuration of the right portion 43*d* is preferably the same as the configuration of the left portion 43*b*. Therefore, the portions of the right portion 43*d* that are the same as those of the left portion 43*b* are designated by the same reference numerals, and further detailed description of the right portion 43*d* is omitted.

As illustrated in FIG. 7, the left side ball joint 47 is interposed between the left portion 43*b* and the left lower arm 33 to pivotably couple the left portion 43*b* to the left lower arm 33. The ball joint 47 is not secured to the body frame 20. The ball joint 47 is preferably a double ball-type ball joint including two joint portions 47*a*. The configuration of the ball joint 47 is, however, not restricted in any way. In the present preferred embodiment, the left side ball joint 47 is coupled to a portion of the left lower arm 33 that is rearward relative to the left drive shaft 41. The left side ball joint 47 is coupled to the rear frame 37*b* of the left lower arm 33. More specifically, a bracket 37*d* is provided on the rear frame 37*b* of the left lower arm 33. The bracket 37*d* is disposed above the rear frame 37*b*. The left side ball joint 47 is secured to the bracket 37*d* by a bolt 48*a* and a nut 37*b*, for example. Thus, one end of the left side ball joint 47 is connected to the rear end of the left portion 43*b*, and the other end of the left side ball joint 47 is connected to the bracket 37*d*. The left side ball joint 47 is disposed behind the left drive shaft 41 and in front of the rear frame 37*b* of the left lower arm 33. As illustrated in FIG. 4, the left side ball joint 47 is disposed above the left lower arm 33 and below the left upper arm 34. As illustrated in FIG. 6, the left side ball joint 47 is below the vehicle body coupling 12 of the left upper arm 34.

As illustrated in FIG. 5, the right side ball joint 47 preferably has a symmetrical shape to the left side ball joint 47 with respect to the vehicle center line CL. The right side ball joint 47 and the left side ball joint 47 are preferably disposed so as to be bilaterally symmetrical to each other. For this reason, the description of the right side ball joint 47 will be omitted.

As illustrated in FIG. 2, the ROV 1 is equipped with a left side suspension 53 that supports the left front wheel 7 and a right side suspension 53 that supports the right front wheel 8. Although the suspensions 53 are not depicted in FIG. 3 for clarity, the upper end portion of the left side suspension 53 is pivotably mounted to the mounting member 54. More specifically, an upper end portion of the left side suspension 53 is preferably mounted to the mounting member 54 by a bolt (not shown) that is inserted through the holes 54L of the mounting member 54. As illustrated in FIG. 4, a bracket 53*a* is provided on the left upper arm 34. The bracket 53a is disposed on the left upper arm 34. The lower end portion of the left side suspension 53 is pivotably mounted to the bracket 53a. Thus, the left side suspension 53 is disposed between the front frame 30 and the left upper arm 34.

Although not shown in the drawings, an upper end portion of the right side suspension 53 is likewise pivotably mounted to the mounting member 54. More specifically, the upper end portion of the right side suspension 53 is preferably mounted to the mounting member 54 by a bolt (not shown) that is inserted through the holes 54R of the mounting member 54. A lower end portion of the right side suspension 53 is pivotably mounted to a bracket 53a, which is provided on the right upper arm 36. The right side suspension 53 is disposed between the front frame 30 and the right upper arm 36.

Thus, in the ROV 1 according to the present preferred embodiment, the dimension L2 of the vehicle body coupling 12 of the left lower arm 33 along the vehicle longitudinal direction is greater than the dimension L1 of the front wheel coupling 11 of the left lower arm 33 along the vehicle longitudinal direction, as illustrated in FIG. 5. The dimension L2 of the vehicle body coupling 12 of the right lower arm 35 along the vehicle longitudinal direction is greater than the dimension L1 of the front wheel coupling 11 of the right lower arm 35 along the vehicle longitudinal direction. In the ROV 1, the left side ball joint 47, which defines the left coupling of the torsion bar 43, is coupled to the left lower arm 33. The right side ball joint 47, which defines the right coupling of the torsion bar 43, is coupled to the right lower arm 35. This means that the ball joints 47 are disposed at a relatively low position. As a result, the center of gravity of the ROV 1 is kept low in the ROV 1. Therefore, the riding comfort is improved.

Furthermore, in the ROV 1, the left side ball joint 47 of the torsion bar 43 is coupled to the rear frame 37b of the left lower arm 33. The right side ball joint 47 of the torsion bar 43 is coupled to the rear frame 37b of the right lower arm 35. Because the front frame 37a is positioned in front of the ball joints 47, flying objects from the front are unlikely to hit the ball joints 47. The ROV 1 according to the present preferred embodiment makes it possible to prevent the ball joints 47 from being hit by flying objects from the front.

In the ROV 1, the central portion 43a of the torsion bar 43 is disposed forward relative to the left drive shaft 41 and the right drive shaft 42. Thus, the left drive shaft 41 and the right drive shaft 42 are unlikely to obstruct the torsion bar 43 when locating the torsion bar 43 on the ROV 1. As a result, freedom in the layout of the torsion bar 43 is increased. In the case where the entire torsion bar 43 needs to be disposed rearward relative to the left drive shaft 41 and the right drive shaft 42, it is necessary to ensure that the torsion bar 43 is not obstructed by the front differential 39, which is connected to the left drive shaft 41 and the right drive shaft 42, and the propeller shaft 112, which is coupled to the front differential 39. This severely restricts the freedom in the vehicle layout design. In contrast, in the ROV 1 of the present preferred embodiment, the front differential 39 and the propeller shaft 112 do not obstruct the central portion 43a of the torsion bar 43 when locating the central portion 43a of the torsion bar 43. As a result, freedom in the layout of the torsion bar 43 is increased.

Moreover, in the case where the entire torsion bar 43 needs to be disposed rearward relative to the left drive shaft 41 and the right drive shaft 42, it is necessary to provide a space to install the torsion bar 43 behind the left drive shaft 41 and the right drive shaft 42. This means that the left drive shaft 41 and the right drive shaft 42 need to be disposed more forward, and as a result, the wheelbase (i.e., the axis distance between the front and rear wheels) becomes longer. In contrast, because the left drive shaft 41 and the right drive shaft 42 is disposed relatively rearward according to the present preferred embodiment, the wheelbase is shortened.

In the ROV 1, the central portion 43a of the torsion bar 43 is disposed above the vehicle body coupling 12 of the left lower arm 33, above the vehicle body coupling 12 of the right lower arm 35, below the vehicle body coupling 12 of the left upper arm 34, and below the vehicle body coupling 12 of the right upper arm 36. The ROV 1 makes it possible to effectively utilize, as a space to install the central portion 43a of the torsion bar 43, the space that is above the vehicle body coupling 12 of the left lower arm 33, above the vehicle body coupling 12 of the right lower arm 35, below the vehicle body coupling 12 of the left upper arm 34, and below the vehicle body coupling 12 of the right upper arm 36. The ROV 1 allows the center of gravity of the ROV 1 to be lower than the case in which the central portion 43a of the torsion bar 43 is disposed above the vehicle body coupling 12 of the left upper arm 34 and the vehicle body coupling 12 of the right upper arm 36. Moreover, it eliminates the need to ensure a space to install the torsion bar 43 above the vehicle body coupling 12 of the left upper arm 34 and the vehicle body coupling 12 of the right upper arm 36, thus increasing the freedom in the layout design of the ROV 1.

As illustrated in FIG. 5, the torsion bar 43 includes the left portion 43b that connects the left end of the central portion 43a and the left side ball joint 47 to each other, and the right portion 43d that connects the right end of the central portion 43a and the right side ball joint 47 to each other. Each of the left portion 43b and the right portion 43d includes the first curved portion 43g curved rearwardly. Thus, the central portion 43a and the left side and right side ball joints 47 are connected to each other in a smooth and compact manner. As a result, the torsion bar 43 is arranged in a compact manner.

As illustrated in FIG. 6, the left portion 43b of the torsion bar 43 is inclined downward toward the rear, as viewed from a side view of the vehicle. Likewise, the right portion 43d of the torsion bar 43 is inclined downward toward the rear, as viewed from a side view of the vehicle. Thus, the central portion 43a and the left side and right side ball joints 47 are connected to each other in a smooth and compact manner. As a result, the torsion bar 43 is arranged in a compact manner.

As illustrated in FIG. 6, the left portion 43b of the torsion bar 43 includes a second curved portion 43f curved downwardly behind the left drive shaft 41, as viewed from a side view of the vehicle. Likewise, the right portion 43d of the torsion bar 43 includes a second curved portion 43f curved downwardly behind the right drive shaft 42, as viewed from a side view of the vehicle. Thus, the center portion 43a of the torsion bar 43 and the left side ball joint 47 are connected to each other smoothly and in a compact manner without being obstructed by the left drive shaft 41. Also, the central portion 43a of the torsion bar 43 and the right side ball joint 47 are connected to each other smoothly and in a compact manner without being obstructed by the right drive shaft 42. As a result, the torsion bar 43 is arranged in a compact manner.

As illustrated in FIG. 4, a portion of the left portion 43b of the torsion bar 43 is disposed between the left lower arm 33 and the left upper arm 34. A portion of the right portion 43d of the torsion bar 43 is disposed between the right lower arm 35 and the right upper arm 36. Thus, the unused space between the left lower arm 33 and the left upper arm 34 is efficiently utilized as a space to install the left portion 43b of the torsion bar 43. Likewise, the unused space between the right lower arm 35 and the right upper arm 36 is efficiently utilized as a space to install the right portion 43d of the torsion bar 43. As a result, the freedom in the layout design of the ROV 1 is increased. In addition, the center of gravity of the ROV 1 is made lower than the configuration in which the left portion 43b of the torsion bar 43 is disposed above the left upper arm 34 and the right portion 43d of the torsion bar 43 is disposed above the right upper arm 36.

Furthermore, as illustrated in FIG. 4, according to the present preferred embodiment, a portion of the left portion 43b of the torsion bar 43 is disposed between the left drive shaft 41 and the left upper arm 34. A portion of the right portion 43d of the torsion bar 43 is disposed between the right drive shaft 42 and the right upper arm 36. Thus, the unused space between the left drive shaft 41 and the left upper arm 34 is efficiently utilized as a space to install the left portion 43b of the torsion bar 43. Likewise, the unused space between the right drive shaft 42 and the right upper arm 36 is efficiently utilized as a space to install the right portion 43d of the torsion bar 43. As a result, the freedom in the layout design of the ROV 1 is increased.

In the ROV 1 according to the present preferred embodiment, each of the left coupling and the right coupling of the torsion bar 43 preferably includes the ball joint 47. As a result, the center portion 43a of the torsion bar 43 and the left lower arm 33 are connected to each other smoothly. Likewise, the center portion 43a of the torsion bar 43 and the right lower arm 35 are connected to each other smoothly.

As illustrated in FIG. 5, the central portion 43a of the torsion bar 43 is disposed in front of the front differential 39. As a result, the unused space in front of the front differential 39 is efficiently utilized as a space to install the central portion 43a of the torsion bar 43, so that the freedom in the layout design of the ROV 1 is increased. That is, if the central portion 43a of the torsion bar 43 needs to be disposed rearward relative to the front differential 39, it is necessary to ensure that the torsion bar 43 is not obstructed by the propeller shaft 112, which is coupled to the front differential 39. This restricts the freedom in the layout design. In contrast, according to the present preferred embodiment, the torsion bar 43 and the propeller shaft 112 do not interfere with each other, allowing more freedom in the layout design.

As illustrated in FIG. 4, the ROV 1 is equipped with the front bumper 49 disposed in front of the front frame 30. The central portion 43a of the torsion bar 43 is disposed behind the front bumper 49. According to the present preferred embodiment, when a flying object comes in from the front, the flying object hits the front bumper 49. Thus, the central portion 43a of the torsion bar 43 is prevented from being hit by flying objects.

As illustrated in FIG. 2, the ROV 1 is equipped with the left side suspension 53 and the right side suspension 53. As illustrated in FIG. 4, the left side suspension 53 is mounted to the left upper arm 34. Although not shown in the drawings, the right side suspension 53 is mounted to the right upper arm 36. The present preferred embodiment makes easier to mount the left side suspension 53 and the right side suspension 53 than the case in which the left side suspension 53 is mounted to the left lower arm 33 and the right side suspension 53 is mounted to the right lower arm 35.

In the foregoing preferred embodiments, a portion of the left portion 43b of the torsion bar 43 is preferably disposed between the left drive shaft 41 and the left upper arm 34 with respect to a vehicle vertical direction, and a portion of the right portion 43d of the torsion bar 43 is preferably disposed between the right drive shaft 42 and the right upper arm 36 with respect to the vehicle vertical direction. However, this configuration is merely illustrative. It is also possible that a portion of the left portion 43b of the torsion bar 43 may be disposed between the left drive shaft 41 and the left lower arm 33 with respect to a vehicle vertical direction and a portion of the right portion 43d of the torsion bar 43 may be disposed between the right drive shaft 42 and the right lower arm 35 with respect to the vehicle vertical direction.

Although the foregoing preferred embodiments describe that the torsion bar 43 includes the left side and right side ball joints 47, it is also possible to eliminate the ball joints 47. It is also possible that the left portion 43b of the torsion bar 43 may be coupled to the left lower arm 33 and the right portion 43d thereof may be coupled to the right lower arm 35.

The terms and expressions which have been used herein are used as terms of description and not of limitation. There is no intention in the use of such terms and expressions of excluding any equivalents of any of the features shown or described, or portions thereof, and it is recognized that various modifications are possible within the scope of the present invention. The present invention may be embodied in many different forms. This disclosure should be considered as providing exemplary preferred embodiments of the principles of the present invention. These preferred embodiments are described herein with the understanding that such preferred embodiments are not intended to limit the present invention to any specific preferred embodiments described and/or illustrated herein. The present invention is not limited to specific preferred embodiments described herein. The present invention encompasses all the preferred embodiments including equivalents, alterations, omissions, combinations, improvements, and/or modifications that can be recognized by those skilled in the arts based on this disclosure. Limitations in the claims should be interpreted broadly based on the language used in the claims, and such limitations should not be limited to specific preferred embodiments described in the present description or provided during prosecution of the present application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising:
   a body frame including a front frame;
   a left front wheel disposed to the left of the front frame;
   a right front wheel disposed to the right of the front frame;
   a left lower arm including a front wheel coupling coupled to the left front wheel and a vehicle body coupling coupled to the front frame;
   a left upper arm including a front wheel coupling coupled to the left front wheel and a vehicle body coupling coupled to the front frame, the left upper arm being disposed above the left lower arm;
   a right lower arm including a front wheel coupling coupled to the right front wheel and a vehicle body coupling coupled to the front frame;
   a right upper arm including a front wheel coupling coupled to the right front wheel and a vehicle body coupling coupled to the front frame, the right upper arm being disposed above the right lower arm;
   a left drive shaft connected to the left front wheel and extending rightward from the left front wheel, the left drive shaft drives the left front wheel; and a right drive shaft connected to the right front wheel and extending leftward from the right front wheel, the right drive shaft drives the right front wheel; wherein a dimension of the vehicle body coupling of the left lower arm along a vehicle longitudinal direction is greater than a dimension of the front wheel coupling of the left lower arm along the vehicle longitudinal direction;

a dimension of the vehicle body coupling of the right lower arm along the vehicle longitudinal direction is greater than a dimension of the front wheel coupling of the right lower arm along the vehicle longitudinal direction; and the vehicle further includes a torsion bar including a central portion extending in a transverse direction and located in front of the left drive shaft and the right drive shaft, a left coupling positioned leftward relative to the central portion and coupled to a portion of the left lower arm that is rearward relative to the left drive shaft, and a right coupling positioned rightward relative to the central portion and coupled to a portion of the right lower arm that is rearward relative to the right drive shaft.

2. The vehicle according to claim 1, wherein:

the left lower arm includes a front frame inclined so as to slope rearward toward the left and a rear frame positioned rearward relative to the front frame and inclined so as to slope forward toward the left;

the right lower arm includes a front frame inclined so as to slope rearward toward the right and a rear frame positioned rearward relative to the front frame and inclined so as to slope forward toward the right;

the left coupling of the torsion bar is coupled to the rear frame of the left lower arm; and the right coupling of the torsion bar is coupled to the rear frame of the right lower arm.

3. The vehicle according to claim 1, wherein the central portion of the torsion bar is disposed above the vehicle body coupling of the left lower arm, above the vehicle body coupling of the right lower arm, below the vehicle body coupling of the left upper arm, and below the vehicle body coupling of the right upper arm.

4. The vehicle according to claim 1, wherein at least one of the left coupling and the right coupling of the torsion bar includes a ball joint.

5. The vehicle according to claim 1, further comprising:

a front differential connected to the left drive shaft and the right drive shaft; wherein the central portion of the torsion bar is disposed in front of the front differential.

6. The vehicle according to claim 1, further comprising:

a front bumper mounted to the front frame and disposed in front of the front frame; wherein the central portion of the torsion bar is disposed behind the front bumper.

7. The vehicle according to claim 1, further comprising:

a left side suspension mounted to the left upper arm; and a right side suspension mounted to the right upper arm.

8. The vehicle according to claim 1, wherein:

the left upper arm includes a front frame inclined so as to slope rearward toward the left, and a rear frame positioned rearward relative to the front frame and inclined so as to slope forward toward the left; and the right upper arm includes a front frame inclined so as to slope rearward toward the right, and a rear frame positioned rearward relative to the front frame and inclined so as to slope forward toward the right.

9. The vehicle according to claim 1, wherein the vehicle is a recreational off-highway vehicle.

10. The vehicle according to claim 1, wherein the left coupling is directly coupled to the portion of the left lower arm that is rearward relative to the left drive shaft, and the right coupling is directly coupled to the portion of the right lower arm that is rearward relative to the right drive shaft.

11. The vehicle according to claim 1, wherein:

the torsion bar includes a left portion that connects a left end of the central portion and the left coupling to each other, and a right portion that connects a right end of the central portion and the right coupling to each other; and each of the left portion and the right portion includes a first curved portion curved rearwardly.

12. The vehicle according to claim 11, wherein each of the left portion and the right portion of the torsion bar is inclined downward toward the rear, as viewed from a side view of the vehicle.

13. The vehicle according to claim 11, wherein:

the left portion of the torsion bar includes a second curved portion curved downwardly behind the left drive shaft, as viewed from a side view of the vehicle; and the right portion of the torsion bar includes a second curved portion curved downwardly behind the right drive shaft, as viewed from a side view of the vehicle.

14. The vehicle according to claim 11, wherein:

a portion of the left portion of the torsion bar is disposed between the left lower arm and the left upper arm; and a portion of the right portion of the torsion bar is disposed between the right lower arm and the right upper arm.

15. The vehicle according to claim 11, wherein:

a portion of the left portion of the torsion bar is disposed between the left drive shaft and the left upper arm; and a portion of the right portion of the torsion bar is disposed between the right drive shaft and the right upper arm.

* * * * *